(12) United States Patent
Ciani

(10) Patent No.: US 9,404,786 B2
(45) Date of Patent: Aug. 2, 2016

(54) DEVICE TO DETECT THE LEVEL OF LIQUID METAL IN A CASTING APPARATUS AND RELATIVE METHOD

(75) Inventor: Lorenzo Ciani, Udine (IT)

(73) Assignee: DANIELI AUTOMATION SPA (IT)

( * ) Notice: Subject to any disclaimer, the term of this patent is extended or adjusted under 35 U.S.C. 154(b) by 556 days.

(21) Appl. No.: 13/814,916

(22) PCT Filed: Aug. 8, 2011

(86) PCT No.: PCT/IB2011/001828
§ 371 (c)(1),
(2), (4) Date: Feb. 7, 2013

(87) PCT Pub. No.: WO2012/020298
PCT Pub. Date: Feb. 16, 2012

(65) Prior Publication Data
US 2013/0147465 A1  Jun. 13, 2013

(30) Foreign Application Priority Data
Aug. 9, 2010  (IT) .............................. UD2010A0159

(51) Int. Cl.
| | | |
|---|---|---|
| *G01F 23/26* | (2006.01) | |
| *B22D 2/00* | (2006.01) | |
| *B22D 11/041* | (2006.01) | |
| *B22D 11/18* | (2006.01) | |
| *B22D 11/20* | (2006.01) | |

(52) U.S. Cl.
CPC ............... *G01F 23/26* (2013.01); *B22D 2/003* (2013.01); *B22D 11/041* (2013.01); *B22D 11/186* (2013.01); *B22D 11/205* (2013.01); *G01F 23/261* (2013.01)

(58) Field of Classification Search
None
See application file for complete search history.

(56) References Cited

U.S. PATENT DOCUMENTS

| | | | |
|---|---|---|---|
| 3,670,801 A * | 6/1972 | Crowell et al. | 164/413 |
| 4,212,342 A * | 7/1980 | Linder et al. | 164/453 |
| 4,279,149 A * | 7/1981 | Block | 73/290 R |
| 4,441,541 A * | 4/1984 | Block | 164/453 |
| 5,103,893 A * | 4/1992 | Naganuma et al. | 164/451 |
| 6,293,142 B1 * | 9/2001 | Pchelnikov et al. | 73/290 R |
| 6,517,604 B1 * | 2/2003 | Kim et al. | 75/386 |
| 6,577,118 B2 * | 6/2003 | Parent et al. | 324/204 |

(Continued)

FOREIGN PATENT DOCUMENTS

| | | | |
|---|---|---|---|
| EP | 0312799 A1 | 4/1989 | |
| EP | 1229313 A2 * | 8/2002 | ............. G01F 23/26 |

(Continued)

OTHER PUBLICATIONS

International Search Report and Written Opinion for PCT/IB2011/001828 European Intellectual Property Office, Jan. 27, 2012.

*Primary Examiner* — Jermele M Hollington
*Assistant Examiner* — Suresh K Rajaputra
(74) *Attorney, Agent, or Firm* — Mannava & Kang, P.C.

(57) ABSTRACT

A device to detect the level of liquid metal (M) in a casting apparatus includes a box-like structure associated in correspondence with an upper end of a crystallizer. The box-like structure has a peripheral cavity inside in which a device for the generation and detection of a variable magnetic field is disposed. The device for the generation and detection extends for a segment beyond an inner corner of the crystallizer so as to face directly into the open top of the crystallizer.

12 Claims, 2 Drawing Sheets

(56) References Cited

U.S. PATENT DOCUMENTS

| | | |
|---|---|---|
| 7,024,932 B2 * | 4/2006 | Nicolazo de Barmon et al. ............................ 73/290 V |
| 7,209,073 B2 * | 4/2007 | Spanke et al. ................. 342/124 |
| 7,255,004 B2 * | 8/2007 | Taylor et al. ................. 73/304 C |
| 7,814,786 B2 * | 10/2010 | Woodard ........................ 73/291 |
| 8,018,227 B2 * | 9/2011 | De Monte et al. ............. 324/228 |
| 8,482,298 B2 * | 7/2013 | Boudaoud et al. ............ 324/652 |
| 8,714,234 B2 * | 5/2014 | Dussud ...................... 164/151.3 |

FOREIGN PATENT DOCUMENTS

| | | | |
|---|---|---|---|
| JP | 57170026 | 10/1982 | |
| JP | 58101143 | 7/1983 | |
| JP | 60216959 A | 10/1985 | |
| JP | 61076914 A | 4/1986 | |
| JP | 61221620 A | 10/1986 | |
| WO | WO 02079770 A1 * | 10/2002 | .............. G01F 23/26 |

\* cited by examiner

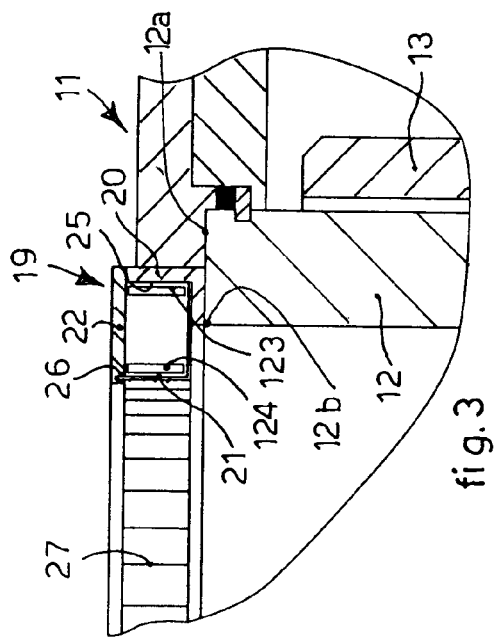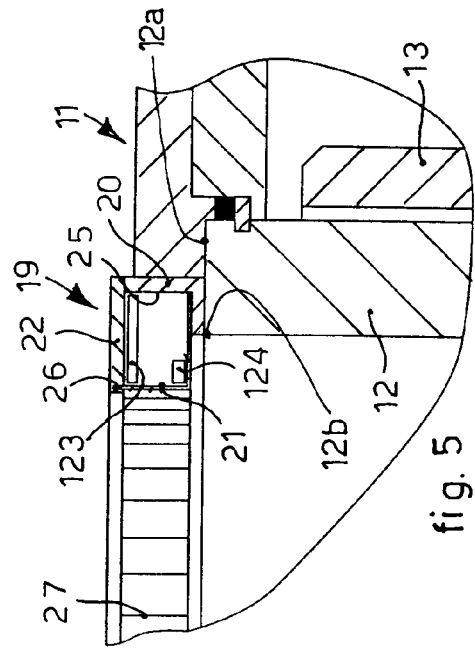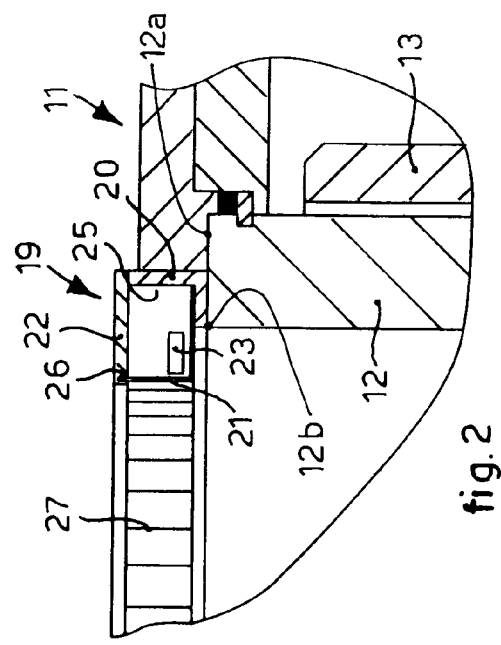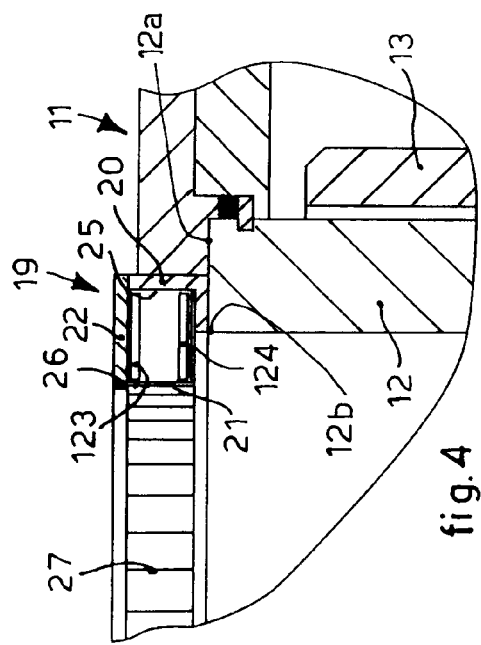

DEVICE TO DETECT THE LEVEL OF LIQUID METAL IN A CASTING APPARATUS AND RELATIVE METHOD

FIELD OF THE INVENTION

The present invention concerns a device to detect the level of liquid metal in a casting apparatus and the relative method.

In particular, the invention concerns a device suitable to detect and allow to determine the level of liquid metal present inside a crystallizer for continuous casting, particularly but not exclusively for the continuous casting of cast products like billets, blooms, slabs or similar.

The invention is applied to every type of crystallizer, of the plate type or tubular, in which the casting occurs in a free cast, or under powder or some other way protected from the surrounding environment.

BACKGROUND OF THE INVENTION

Different devices for detecting the level of liquid metal in a casting apparatus are known, which use different reading principles.

For example, devices with radioactive isotopes are known, which comprise an emitter which emits radiation in the direction of the crystallizer containing the liquid steel, and a receiver positioned opposite the emitter on the opposite side of the crystallizer, which receives the radiations. In relation to the intensity of radiations received it is possible to determine the level of liquid metal present in the crystallizer, interposed between the emitter and receiver.

These devices have the disadvantage, however, that they do not distinguish the actual level of the meniscus of the liquid metal with respect to an overlying covering layer of powders which is normally deposited as a protection for the metal bath and as lubrication.

Devices of the thermic type are also known, which detect the development of the temperature profile of the crystallizer due to the presence of the liquid steel, but these have the disadvantage that they are subject to errors due to perturbations of the heat flow between the liquid steel and the crystallizer, generally due to the instability of the lubrication function performed by the protection powder.

Among the devices to detect the level of metal liquid of the electromagnetic type, for example those shown in EP-A1-312,799 and U.S. Pat. No. 3,670,801, a device is known which can be applied to crystallizers both of the plate and tubular type which exploit the variable magnetic field generated by an excitation coil localized in proximity to a perimeter point on the upper end of the crystallizer, in order to induce induced currents in the liquid steel present in the ingot mold.

By striking the liquid steel with a variable magnetic field, induced currents are known to be generated therein.

The induced currents in the liquid steel, in their turn, generate an induced reaction magnetic field which is detected by suitable reception coils of the device, localized adjacent to the excitation coil.

The reaction magnetic field is amplified and processed by a control unit to determine, depending on its intensity, the level of liquid metal in the crystallizer.

In particular the device is disposed above the crystallizer and directly in proximity to its wall, so that one of its surfaces sensitive to emission/reception, in correspondence to which the excitation and reception coils are disposed, is substantially coplanar with the wall of the crystallizer.

More specifically the device has a rather compact shape, its sensitive surface is substantially conformed with the same shape as the wall of the crystallizer and covers only a determinate limited sector of the latter.

One disadvantage of these known devices is that, above all in the case of large cast products, the detection of the level of liquid metal is concentrated to a limited detection zone, dictated by the size of the device and by the intensity of the excitation currents of the excitation coils, which is, however, limited by technical parameters.

Moreover, when it is necessary to detect the level of molten metal in large ingot molds it is necessary to pre-dispose several devices, equidistant to each other, along the periphery of the ingot mold, thus entailing a considerable complexity in application, and also in processing the signals detected.

The magnetic field generated by the excitation coils of known devices is subject to deviation effects of the field lines, substantially due to the walls of the crystallizer which are normally made of copper.

The deviation effects are even more accentuated in proximity to the lateral edges of the sensitive surface which is practically in contact with or in any case coplanar to the crystallizer walls.

One purpose of the present invention is to achieve a device which allows to detect with precision the average level of the meniscus of the liquid metal also for large cast products.

Another purpose of the present invention is to achieve a device to detect the level of liquid metal in a casting apparatus which allows to detect with precision the actual level of liquid metal, limiting or in any case controlling the disturbance effects due to the copper walls of the crystallizer or to other causes.

It is also a purpose of the present invention to achieve a detection device which is reliable, economical and simple to make and install on the ingot mold body.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, a device to detect the level of liquid metal is applied in a casting apparatus which comprises at least a crystallizer inserted in an ingot mold body, attached, in its turn, on an oscillating bench.

The crystallizer is of the type with walls or tubular, and comprises an upper edge which surrounds an open top through which the liquid metal to be cast is discharged.

According to a characteristic feature of the present invention, the device comprises a box-like structure which is attached in correspondence with the upper end of the crystallizer, which extends peripherally thereto at least for a part of the perimeter extension of the upper edge of the crystallizer, and defines an internal hollow inside which, for at least a substantial part of its perimeter extension, at least a mean is disposed, for the generation and detection of a variable magnetic field.

According to the invention, at least the magnetic field detection mean is protruding toward the inside of the crystallizer in order to directly face the surface of the liquid metal, therefore without the interposition of crystallizer walls or other obstacles of whatever type.

The generation and detection mean is suitable to generate a variable magnetic field, advantageously alternate, with a desired frequency, which is propagated at least partly into the liquid metal, in order to generate induced currents therein, and to detect a signal of a reaction magnetic field which is generated by the induced currents.

The signal generated by the reaction magnetic field is then made available to a command and control unit which is suitable to process the signal and to determine the level of liquid metal present in the crystallizer.

Given the particular disposition of the magnetic field generation and detection mean, that is, directly facing the liquid metal and protruding toward the inside of the crystallizer, it is possible to concentrate the field lines to a greater extent toward the inside of the crystallizer, and therefore to affect a very ample zone of the meniscus of the liquid metal of which the level is to be detected.

According to a variant, the box-like structure occupies the whole perimeter extension of the upper end of the crystallizer, and the cavity defined by it is closed and tubular, or rather toroidal with a section which is preferably, but not exclusively, rectangular or square.

A variant of the present invention provides that the magnetic field generation and detection mean comprises a single excitation/reception coil, the spirals of which wind inside the tubular cavity, surrounding the crystallizer, and are at least partly protruding inside it.

In this way, fed with an advantageously alternate electric current which is of suitable frequency, the excitation/reception coil generates a variable magnetic field which affects diffusely the liquid metal contained in the crystallizer. Moreover, the excitation/reception coil allows to detect the signal produced by the magnetic reaction field generated by the induced currents in the liquid metal, in the whole perimeter zone, in order to therefore obtain a very precise signal correlated to the average level of the liquid metal present in the crystallizer.

It is advantageous to provide that, during the step of detecting the level of liquid metal in the crystallizer, a measurement of the impedance variation of the excitation/reception coil is carried out.

In another variant, the magnetic field generation mean comprises an excitation coil and a reception coil both of which extend, at least partly, inside the tubular cavity, surrounding the crystallizer.

In this case, it is advantageous to provide that at least the detection coil is placed protruding toward the inside of the crystallizer so that it receives the reaction magnetic field due to the induced currents in the liquid metal.

In one form of embodiment, the box-like structure comprises a structural shape with a substantially L-shaped section, disposed at the upper end of the crystallizer, and extended to the whole perimeter, an annular closing flange which is disposed at the upper part of the L-shaped iron, and a protection cover disposed between the L-shaped iron and the closing flange, in order to define therewith the tubular cavity.

The protection cover, when in position, advantageously protrudes toward the inside of the crystallizer and at least the magnetic field generation and reception mean is placed in proximity to it.

In an advantageous variant, the protection cover is provided with notches made transverse to the perimeter direction, and suitable to prevent the formation and circulation, in the cover, of disturbing parasitic currents.

A further variant of the present invention provides that the L-shaped iron and the closing flange are made of copper so as to exert, on the magnetic field generated by the generation means, a concentration effect toward the liquid metal.

Moreover, again with the same purpose and according to a further advantageous variant, the protection cover is made with a preformed steel plate, preferably austenitic, and very thin, so as to minimize the screening effect on the excitation and reaction magnetic fields used to detect the level.

It is also advantageous to provide that the device comprises a sensor to detect the movement of the oscillating bench, in order to determine its oscillation frequency and phase. This is useful during the processing step using the command and control unit in order to carry out a further validation action of the measurement of the level of liquid metal present in the crystallizer.

The present invention also concerns a relative method to detect the liquid metal in a casting apparatus.

In particular the method comprises a step of generating a variable magnetic field having field lines which are at least partly propagated in the molten metal so as to generate induced currents therein, and a step of detecting a variable electric signal generated by the reaction magnetic field due to the currents induced.

The variable magnetic field is generated by at least a mean for the generation and detection of a variable magnetic field, which is disposed in a box-like structure solid with the upper end of the crystallizer and which extends peripherally thereto for the whole, or for a substantial part of its perimeter extension.

The detection step provides to detect a variable electric signal generated by the reaction magnetic field generated due to the induced currents in the liquid metal, in order to supply it to a command and control unit which processes it so as to determine the level of the liquid metal present in the crystallizer, given that the amplitude and the phase of the variable electric signal is in close relation with the level of the liquid metal.

BRIEF DESCRIPTION OF THE DRAWINGS

These and other characteristics of the present invention will become apparent from the following description of a preferential form of embodiment, given as a non-restrictive example with reference to the attached drawings wherein:

FIG. 2 is an enlarged view of a detail in FIG. 1;

FIGS. 3, 4 and 5 are variant representations of FIG. 2.

Figure 1:
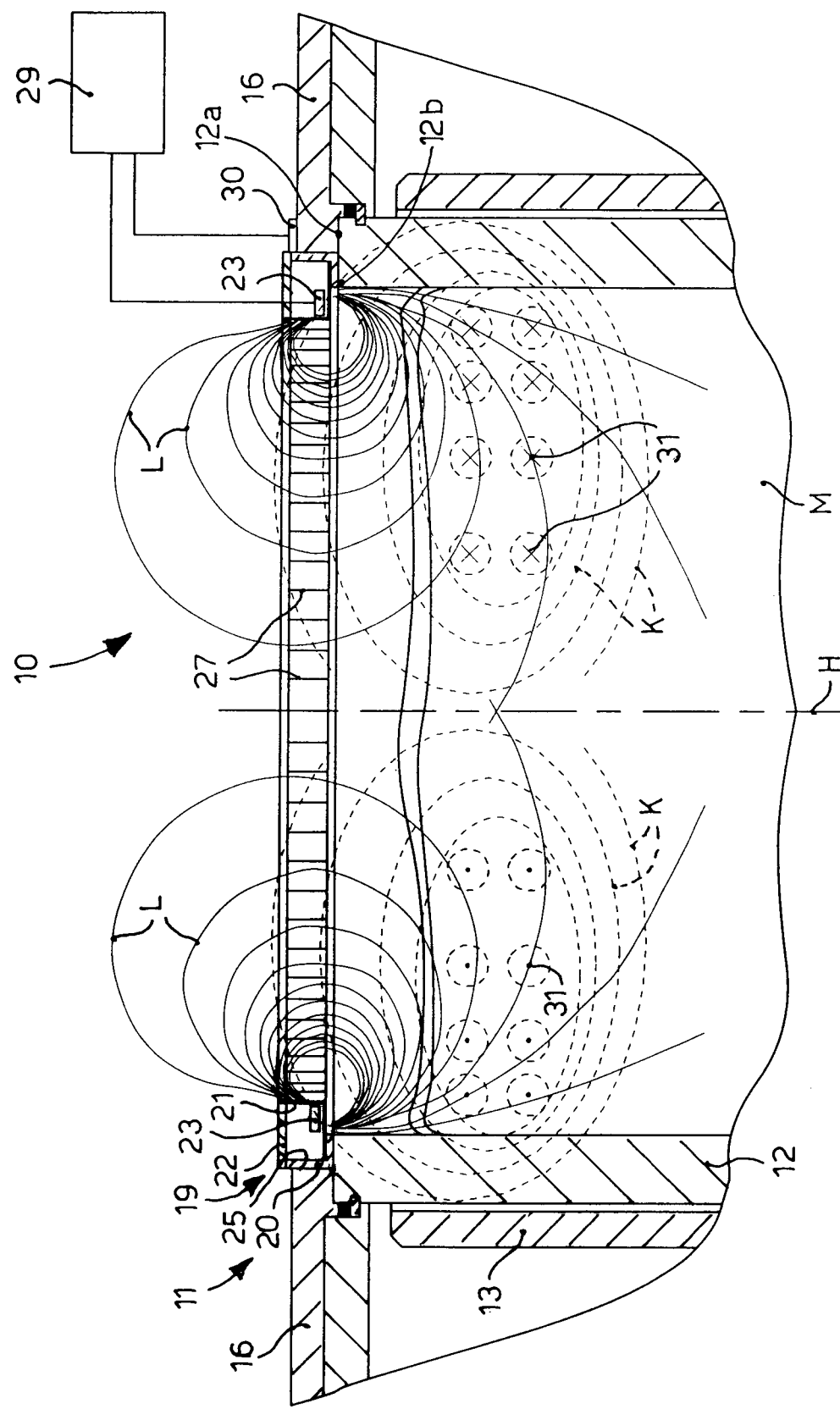
FIG. 1 is a schematic representation in section of a device to detect the level of liquid metal applied to a casting apparatus according to the present invention.

To facilitate comprehension, the same reference numbers have been used, where possible, to identify identical common elements in the drawings. It is understood that elements and characteristics of one form of embodiment can conveniently be incorporated into other forms of embodiment without further clarifications.

DETAILED DESCRIPTION OF A PREFERENTIAL FORM OF EMBODIMENT

With reference to FIG. 1, a device to detect the level of liquid metal in a casting apparatus is indicated in its entirety by the reference number 10 and is applied, in this case, to an ingot mold 11 for large round pieces, for example with diameters of more than 400 mm.

The ingot mold 11 comprises a conveyor 13, which is a guide and containment element of the ingot mold 11, and a crystallizer 12. The crystallizer 12, as is well known to persons of skill in the art, consists of a box-like structure, with a polygonal section (square or rectangular for example), or round, oval and other, and may consist of walls solid with each other or by a single tubular structure.

The upper part of the crystallizer 12 is open during use, so that the discharge element of the liquid metal can be introduced.

The walls of the crystallizer 12 are usually made of copper and suitably cooled by water in known ways; the molten steel "M" is cast therein and the first solidification skin is formed. The ingot mold 11 is mounted on an oscillating bench (not visible in the drawing), which oscillates vertically to promote the separation of the liquid steel from the walls of the crystallizer 12 and its regular advance.

The level detection device 10 according to the present invention is mounted directly in correspondence with the upper edge 12a of the crystallizer 12, and is clamped on the ingot mold 11 by means of an attachment flange 16.

The device 10 is provided with a box-like structure 19 which, with respect to the crystallizer 12, rests on and extends along its upper edge, in this case, for the whole of its perimeter extension, and at least one of its internal parts faces and protrudes toward the inside of the crystallizer 12.

In this way, the device 10 to a certain extent covers the upper edge 12a of the crystallizer 12, thus allowing to dispose the relative magnetic and electromagnetic components directly facing the molten metal cast inside the crystallizer 12, as described hereafter.

The box-like structure 19 (FIG. 2) comprises a structural shape 20, closed on the perimeter, in this case annular, with a substantially L-shaped section, an upper closing flange 22, which is also substantially annular, and a protection cover 21 with an L-shaped section and an annular shape.

Both the closed structural shape 20, the protection cover 21 and the closing flange 22 are disposed and extend along the upper edge 12a of the crystallizer 12, for the whole of its perimeter extension.

It is clear that, if the device 10 is applied on an ingot mold of the tubular or plate type, for the production of products with a rectangular section, the box-like structure 19 which defines and contains components of the device 10, instead of developing in an annular manner, would extend with a substantially rectangular shape in order to conform to the perimeter development of the walls of the crystallizer 12 and in particular of its upper edge.

More specifically, the closed structural shape 20 is disposed on the upper edge 12a of the crystallizer 12, the closing flange 22 is attached on the vertical side of the L-shaped section of the closed structural shape 20 and the protection cover 21 is respectively disposed on the horizontal side of the closed structural shape 20 and is clamped at the upper part inside the closing flange 22. For this purpose the closing flange 22 is provided with a circumferential groove 26 in which the vertical side of the protection cover 21 is inserted and clamped.

When in position therefore, the protection cover 21 projects directly toward the inside of the crystallizer 12, that is, the free space inside the upper edge 12a, and protects the parts of the device 10 from possible splashes of molten steel or powder which are normally present in this zone.

The box-like structure 19 defines a tubular cavity 25 with a rectangular or square section inside which an excitation/reception coil 23 is disposed, advantageously in proximity to the horizontal side of the closed structural shape 20, and in the zone projecting toward the inside of the crystallizer 12; the spirals of the coil 23 wind circumferentially in the tubular cavity 25, thus following the upper perimeter of the crystallizer 12.

Advantageously, as can be seen in the drawings, the coil 23 is disposed so that it extends at least partly beyond the inner corner 12b of the edge 12a of the crystallizer 12, so that part of it is directly facing the liquid metal present inside the crystallizer 12.

The coil 23 (FIG. 1) is suitable to generate a variable magnetic field having field lines L that are propagated with a substantially annular development inside the crystallizer 12, disposed on radial planes passing through a vertical axis H, and to detect a reaction magnetic field generated as will be described hereafter.

In order to intensify the magnetic field inside the crystallizer 12, and hence in the molten steel M, and to minimize the dispersion of the field lines toward the external zone above the crystallizer, it is advantageous to provide that the closed structural shape 20 and the closing flange 22 are made of copper, whereas the protection cover 21 is made of stainless steel advantageously of the austenitic type and is very thin, for example a plate, so as to minimize the screening effect on the variable magnetic fields.

For the same reason the protection cover 21 is provided with notches 27 made equidistant over the whole of its circumferential development, on both the horizontal and the vertical side.

The notches 27, coplanar with the field lines L, are suitable to prevent the circulation of parasitic currents in the protection cover 21, generated both due to the effect of the variable magnetic field emitted by the excitation/reception coil 23, and also due to the effect of the reaction magnetic field induced in the liquid metal.

The excitation/reception coil 23 is also connected, for example by an electric cable or a data communication cable, to a command and control unit 29, to receive electric feed in frequency and to transfer the data detected and to allow, as will be described hereafter, a subsequent processing of the estimated level of the molten steel in the crystallizer 12.

The device 10 is put in proximity with means, not shown in the drawings, for cooling the walls of the crystallizer 12, which provide to cool the device and prevent it from overheating.

In another form of embodiment, it is possible to provide that the device 10 comprises cooling means disposed inside the tubular cavity 25 or outside the box-like structure 19, to prevent it from overheating.

In a particular form of embodiment, the device 10 can also comprise an accelerometer 30, of a known type, mounted near the closed structural shape 20, solid with the same, and connected to the command and control unit 29 by means of an electric cable or a data transmission cable.

The accelerometer 30 is suitable to detect the oscillation movement of the ingot mold body 11 and to transmit a signal with the information relating to said movement to the command and control unit 29.

In a variant form of embodiment (FIG. 3), instead of being provided with a single excitation/reception coil 23, the device 10 comprises respectively a first excitation coil 123 and a second reception coil 124, concentric with the first, the spirals of which have a mainly vertical distribution inside the tubular cavity 25. In this case too, the coils 123 and 124 extend laterally beyond the inner corner 12b of the upper edge 12a of the crystallizer 12, so that they are facing directly the liquid metal disposed inside it.

In particular, the excitation coil 123 is disposed near the vertical side of the closed structural shape 20, whereas the reception coil 124 is disposed inside the excitation coil 123 near the vertical side of the protection cover 21 and therefore projecting toward the inside of the crystallizer 12.

Both the excitation coil 123 and the reception coil 124 are connected to the command and control unit 29 as described above.

In another form of embodiment (FIG. 4), the excitation coil 123 and the reception coil 124 have a substantially horizontal development, or radial, and respectively the first is put near the closing flange 22 and the second is put near the horizontal side of the closed structural shape 20.

In yet another form of embodiment (FIG. 5), similar to the one described with reference to FIG. 4, the reception coil 124 is substantially concentrated near the corner of the protection cover 21 or near the zone projecting directly toward the inside of the crystallizer 12.

The device 10 for reading the level according to the present invention functions as follows.

In order to detect the level of the molten steel inside the ingot mold 11, the excitation/reception coil 23, or the excitation coil 123, is fed by means of the command and control unit 29 with variable electric current, advantageously alternate, so as to generate a magnetic field in frequency having field lines L that are propagated inside the molten steel, among others.

Given that the coil 23 or 123 develops around the mold 11, the magnetic field generated uniformly affects the liquid steel present inside the crystallizer 12, allowing to obtain a precise indication of the average level of liquid metal.

The field lines L, interacting with the molten steel M, generate induced currents 31, in a known manner, with a frequency correlated to that of the feed currents of the coils 23, 123 and with an intensity correlated to the distance of the meniscus from the device 10.

The induced currents 31 in the molten steel M in turn generate a reaction magnetic field, isofrequential with the currents 31, having field lines K which partly concatenate with the coil 23 or the reception coil 124.

More specifically, the intensity of the reaction magnetic field that concatenates with the reception coil 124 is a function of the level of the molten steel M contained in the mold 11.

On the contrary, the phase of the reaction magnetic field is correlated to the electric and magnetic properties of the conductor material in which the reaction magnetic field is generated.

The phase characteristic allows to discriminate the concatenated reaction magnetic field with the currents induced in the molten steel with respect to the concatenated field with the induced currents circulating in the internal copper walls of the crystallizer 11, which is also inevitably struck by the field produced by the excitation coil 23, 123.

The intensity and phase of the reaction magnetic field are detected by the command and control unit 29 with known techniques and methodologies.

If there is a single excitation/reception coil, the measurement of the level is obtained by detecting the overall impedance of said coil.

If there are separate excitation 123 and reception 124 coils, the characteristics of amplitude and phase of the signal captured by the reception coil 124 are detected, referring to those of the current that feeds the excitation coil 123.

Given that the magnetic field generated also affects the copper walls of the crystallizer 12, and that induced currents are set up in the crystallizer 12 too, the command and control unit will also receive a contribution which has no relation to the level of steel in the mold 11. In particular, this contribution is greatly influenced by the temperature of the part of the crystallizer 12 which is above the meniscus of liquid steel and, if it is not adequately separated and neutralized, it can distort the measurement of the level of liquid metal.

However, as we have said, the contribution to the reception signal deriving from the currents induced in the copper of the crystallizer has a different phase characteristic from that of the steel, and it is therefore possible to separate the contribution, using known demodulation techniques, so as to eliminate the corresponding component that is a source of error in the measurement.

Moreover, the detection is not distorted if on the meniscus of the molten steel a possible layer of powder "P" is distributed, with a protective and anti-oxidizing function, since casting powder is typically not conductive and therefore induced currents cannot circulate in it.

According to another form of embodiment, to increase the reliability of the level detection it is also possible to exploit the oscillation of the ingot mold body 11. In this case, as well as the detection obtained by exploiting the characteristics of amplitude and phase of the variable magnetic field generated by the current that feeds the coils 23, 123, it is also possible to observe and measure the depth, that is, the intensity, of the modulation produced on the variable signal received due to the effect of the oscillation motion of the mold 11. The modulation of the amplitude of the signal received is determined by the fact that the detector device 10 oscillates solidly with the mold 11 and consequently its distance from the meniscus is continuously modified with the same law of oscillation. The movement of oscillation of the mold 11 has a much lower frequency than that of the variable signal, for example, in the range of 2 Hz, and is easy to detect and distinguish.

To facilitate the detection of the modulating signal, it is convenient to acquire the characteristics of amplitude and phase of the oscillatory motion with an accelerometer 30, installed solid with the mold 11.

In this case, the amplitude of the modulation is not influenced by disturbing components due to the presence of the crystallizer, because the latter oscillates rigidly with the device 10, and only depends on the distance of the meniscus from the device 10, that is, on the average level of liquid metal.

In this case, given the low frequencies of the signal detected and in order to guarantee a sufficiently short detection and response time, the command and control unit 29 is provided with a prediction module, for example of the Kalman type, which makes an estimate and supplies the value of the level in a shorter time than the oscillation period of the ingot mold body 11.

It is clear that modifications and/or additions of parts may be made to the device for detecting the level of the liquid metal in a casting apparatus and relative method as described heretofore, without departing from the field and scope of the present invention.

The invention claimed is:

1. A device to detect the level of liquid metal (M) in a casting apparatus which comprises at least a crystallizer, wherein said crystallizer has lateral walls, or is of a tubular shape, and comprises an upper edge which, with respect to one of its inner corners, defines an open top through which the liquid metal (M) to be cast is discharged, wherein the device comprises a box-like structure associated in correspondence with the upper end of the crystallizer and extending along the aforesaid upper edge, for at least a part of said box-like structure's perimeter, said box-like structure having a peripheral cavity inside which, for at least a substantial part of a perimeter extension, at least a means is disposed, protruding at least partly toward the inside of said crystallizer, for the generation and detection of a variable magnetic field, wherein said generation and detection means extends for at least a segment thereof beyond said inner corner of the crystallizer so as to face directly into the open top of the crystallizer, said generation and detection means being suitable to generate a variable magnetic field (L) which is propagated at least partly in said liquid metal (M), in order to generate induced currents therein, and to detect a signal of a reaction magnetic field (K), generated by said induced currents, and to render said signal available to a command and control unit suitable to process said signal and to determine the level of liquid metal (M) present in the crystallizer.

2. The device as in claim 1, wherein said box-like structure occupies the whole perimeter extension of the upper edge of said crystallizer, and the cavity is closed and tubular.

3. The device as in claim 1, wherein said magnetic field generation and detection means comprises an excitation/reception coil, including spirals which wind in said cavity, at least partly surrounding said crystallizer.

4. The device as in claim 1, wherein said generation and detection means comprises an excitation coil and a reception coil both having spirals which wind in said closed cavity and at least partly surround said crystallizer.

5. The device as in claim 4, wherein said reception coil is disposed protruding toward the inside of said crystallizer.

6. The device as in claim 1, wherein said box-like structure comprises a closed structural shape with a substantially L-shaped section, disposed at the upper end of said crystallizer, a closing flange disposed at the upper part of said closed structural shape and a protection cover disposed between said closed structural shape and said closing flange, protruding toward the inside of said crystallizer, and suitable to define, together with said closing flange and said closed structural shape, said cavity.

7. The device as in claim 6, wherein said protection cover is provided with notches transverse to the protection cover's perimeter extension, suitable to prevent the formation of disturbing parasitic currents.

8. The device as in claim 6, wherein said closed structural shape and said closing flange are made of copper.

9. The device as in claim 6, wherein said protection cover is made with a preformed steel plate that is austenitic.

10. The device as in claim 1, comprising a detection sensor of the oscillation of said casting apparatus in order to determine the amplitude, the frequency and the phase of oscillation.

11. A method to detect the level of liquid metal in a casting apparatus comprising at least a crystallizer in which said liquid metal (M) is cast, wherein said crystallizer has lateral walls, or is of a tubular shape, and comprises an upper edge which, with respect to an inner corner, defines an open top through which the liquid metal (M) to be cast is discharged, wherein the method comprises generating a variable magnetic field having field lines (L) which are at least partly propagated in said molten metal (M) so as to induce induced currents therein, said variable magnetic field being generated by means of at least a means for the generation and detection of a variable magnetic field, disposed in a box-like structure which is associated in correspondence with the upper end of said crystallizer and which extends, together with said magnetic field generation and detection means, along the upper edge of said crystallizer for at least a substantial part of its perimeter, wherein at least part of said generation and detection means protrudes with respect to the inner corner of said upper edge so as to directly face the metal liquid (M) present inside the crystallizer; and detecting a signal of a reaction magnetic field generated by said induced currents in order to supply the signal to a command and control unit which processes said signal and determines the level of the liquid metal (M) present in the crystallizer.

12. The method as in claim 11, wherein during said the detecting of said reaction magnetic field signal, the variation in impedance of said magnetic field generation and detection means which comprises an emission/reception coil is measured.

* * * * *